United States Patent [19]

Asshauer

[11] Patent Number: 5,482,229
[45] Date of Patent: Jan. 9, 1996

[54] APPARATUS FOR GENERATING ENERGY ON BOARD OF AN AIRCRAFT

[75] Inventor: Hartwig Asshauer, Hamburg, Germany

[73] Assignee: Deutsche Aerospace Airbus GmbH, Hamburg, Germany

[21] Appl. No.: 260,043

[22] Filed: Jun. 15, 1994

[30] Foreign Application Priority Data

Jun. 18, 1993 [DE] Germany ............ 43 20 302.7

[51] Int. Cl.⁶ .................................... B64D 13/00
[52] U.S. Cl. .......................... 244/118.5; 244/58; 454/74; 454/76; 454/115; 454/141
[58] Field of Search ............... 244/118.1, 118.5, 244/58, 53 R; 454/74, 69, 70, 71, 72, 75, 76, 115, 141; 60/39.142, 39.07

[56] References Cited

U.S. PATENT DOCUMENTS

| | | | |
|---|---|---|---|
| 2,777,301 | 1/1957 | Kuhn | 244/118.5 |
| 3,140,064 | 7/1964 | Gengelbach | 244/58 |
| 4,261,416 | 4/1981 | Hamamoto | 244/118.5 |
| 4,419,226 | 12/1983 | Cronin et al. | 454/74 |
| 4,684,081 | 8/1987 | Cronin | 244/118.5 |
| 5,137,230 | 8/1992 | Coffinberry | 244/58 |

FOREIGN PATENT DOCUMENTS

| | | |
|---|---|---|
| 0035909 | 9/1981 | European Pat. Off. . |
| 1129608 | 1/1957 | France ............ 244/118.5 |
| 3801042 | 7/1988 | Germany . |

Primary Examiner—Galen L. Barefoot
Attorney, Agent, or Firm—W. G. Fasse; W. F. Fasse

[57] ABSTRACT

An apparatus for generating or recovering energy on board an aircraft effectively utilizes the cabin exhaust air stream, which has a high thermal energy and a differential pressure, before it is discharged into the environment outside the aircraft. In this manner, the total efficiency of the aircraft is improved. The apparatus essentially includes an energy conversion unit (8) connected to the cabin exhaust air duct (2) to generate or recover energy from the exhaust air stream (5). Bleed or tap air (11) from the engine (10) is provided from a bleed air port (10A) through a cabin supply air duct or tap air duct (3) to an air conditioning plant (12) for final preparation of cabin supply air. A heat exchanger (4) is arranged between the cabin exhaust air duct (2) and the tap air duct (3), upstream of the energy conversion unit (8) in the cabin exhaust air duct (2). In this manner, the thermal energy transferred from the tap air (11) to the cabin exhaust air (5) by the heat exchanger (4) is effectively utilized or recovered by the energy conversion unit (8) rather than being simply discharged overboard.

16 Claims, 4 Drawing Sheets

FIG.1

APPARATUS FOR GENERATING ENERGY ON BOARD OF AN AIRCRAFT

FIELD OF THE INVENTION

The invention relates to an apparatus for generating or recovering energy on board an aircraft, especially a passenger aircraft.

BACKGROUND INFORMATION

In the field of aircraft manufacturing, it is already known to use the pressure differential between the air in the pressurized cabin and the ambient air surrounding an aircraft for generating or recovering energy. Namely, the cabin exhaust air that is removed or allowed to escape from the cabin can be used for generating or recovering energy due to its higher pressure relative to the ambient environment outside of the aircraft. For example, German Patent Laying-Open Publication 3,801,042 describes a system in which aircraft cabin exhaust air passes through an expansion turbine to drive the turbine and thereby drive a compressor. In that system, the expanded, cooled air exiting from the expansion turbine is used to cool a heat exchanger for the cabin air supply preparation plant, while the compressor compresses external ambient air to be delivered into the cabin.

It is also known, for example from European Patent Application 0,035,909, to provide bleed air or tap air from an engine bleed air discharge port of a jet engine, through a tap air duct, and into the air conditioning plant. Thus, the tap or bleed air is a source of fresh air and energy for driving the air conditioning plant. However, because the tap air bled from the jet engines has a high temperature, it is precooled, as is typical, before being delivered to the air conditioning plant. The precooling is realized by means of one or two heat exchangers. The hot tap air stream flows through one passage of the heat exchanger(s) and a cooling air stream flows through the other passage of the heat exchanger(s). The cooling air stream is a ram air stream and/or a cabin exhaust air stream, which respectively pass through the heat exchanger(s) and take up thermal energy given off by the tap air stream. The cooling air stream, which has now been heated, is simply discharged overboard to the outside environment around the aircraft through a discharge duct, without making any use of the thermal energy carried by the cooling air stream.

OBJECTS OF THE INVENTION

In view of the above it is the aim of the invention to achieve the following objects singly or in combination:

to provide an apparatus that effectively utilizes the high degree of thermal energy as well as the decompression energy carried by a cabin exhaust air stream, before the cabin exhaust air is discharged overboard, thereby improving the overall operating efficiency of an aircraft;

to arrange an energy conversion unit in the flow path of the cabin exhaust air for recovering the energy of the exhaust air and providing that energy to be used by one or more energy consuming loads;

to appropriately arrange a heat exchanger in such an apparatus so that the cabin exhaust air is heated and the cabin supply air is cooled while passing through the heat exchanger, thereby increasing the effectiveness of the energy conversion unit and reducing the need for additional cooling of the cabin supply air;

to minimize or avoid the use of a precooler for precooling the engine bleed or tap air that is to be provided as cabin supply air;

to provide the energy from the energy conversion unit as electrical, pneumatic, hydraulic or mechanical energy that can be used by a load external to the disclosed apparatus;

to use the energy provided by the energy conversion unit internally in the apparatus, namely to drive a compressor that compresses engine tap air or external ambient air for delivery as cabin supply air, whereby the bleed pressure and bleed volume of the engine bleed or tap air can be reduced so as to improve the overall efficiency of the engine; and to use the cabin exhaust air stream in a thrust nozzle to directly supplement the forward acting thrust propelling the aircraft.

SUMMARY OF THE INVENTION

The above objects have been achieved in an apparatus according to the invention, wherein the cabin exhaust air stream flows through a cabin exhaust air duct that is connected at one end to the pressurized cabin of the aircraft and at the other end to the ambient environment outside the aircraft. A heat carrying medium is provided by a heat source and flows through a transfer duct, for example, hot tap air is provided by the engines into a cabin supply air duct. A heat exchanger is arranged between the cabin exhaust air duct and the transfer duct in such a manner that the cabin exhaust air stream entering the heat exchanger has a relatively low temperature and is heated by passing through the heat exchanger, while the heat carrying medium has a relatively high temperature upon entering the heat exchanger and is cooled by passing through the heat exchanger. Finally, an energy conversion unit is arrange in the flow path of the cabin exhaust air stream, downstream from the heat exchanger, and an energy consuming load is connected to the energy conversion unit.

In this arrangement according to the invention, it is especially advantageous that the thermal energy given off by the heat carrying medium to the cabin exhaust air is recovered and is not simply discharged overboard without being utilized. According to the invention, the otherwise unutilized energy is recovered and can be used to carry out technical work within the apparatus, or on board the aircraft externally to the apparatus, or even as a supplemental thrust propelling the aircraft.

It is a further advantage of the invention, that when engine bleed or tap air provided by a main engine or auxiliary engine is used as cabin supply air, the coolers of the air conditioning plant are at least partially relieved of the cooling load because the tap air is first cooled by the heat exchanger as described above. Thus, the temperature of the tap air is reduced as it passes through the heat exchanger, before being delivered to the coolers of the air conditioning plant. This effectively increases the overall cooling capacity of the air conditioning plant. Even when the tap air must additionally be precooled directly at the engine, the tap air will pass through both the precooler and the heat exchanger before being provided to the air conditioning plant. By properly arranging a heat exchanger between the cabin exhaust air duct and the tap air duct, the required precooling of the tap air can at least be minimized.

According to one embodiment of the invention, the energy conversion unit may comprise an exhaust air turbine, of which the output shaft provides mechanical rotational energy or power. An energy delivery machine or system such as an electrical generator, a pneumatic or hydraulic pump, or a mechanical drive train, may be coupled to the output of the exhaust air turbine. In this manner, the output energy can be provided as electrical, pneumatic, hydraulic or mechanical energy to corresponding energy consuming loads external to the apparatus disclosed herein.

In another embodiment, the mechanical, rotational energy available at the output shaft of the exhaust air turbine is used directly within the apparatus of the invention. Namely, a compressor can be coupled to the output shaft of the exhaust air turbine and used to further compress the engine tap air in order to increase the pressure potential or pressure differential relative to the ambient external air. In order to achieve this, the compressor has its inlet connected to the engine bleed air discharge port and has its outlet connected to the bleed or tap air duct, which leads to the cabin air supply system. In this manner, the tap or bleed pressure necessary in the engine for providing the tap air is reduced, which can achieve an improvement of the operating efficiency of the engine.

In still another embodiment, the mechanical rotational energy provided at the output shaft of the exhaust air turbine is used to drive a compressor for compressing external ambient air. In this case, the compressor has its inlet connected to the ambient environment outside the aircraft through an external air duct and has its outlet connected to the tap air duct through a connecting duct. The compressed external air is mixed with the tap air and delivered as a corresponding mixture to the air conditioning plant. In the manner, the required bleed air or tap air volume to be provided by the engine is reduced, whereby the required compression work is reduced, so that the fuel consumption of the engine is improved. Thereby, the overall operating efficiency of the engine is also positively affected, i.e. increased.

According to a further embodiment of the invention, the energy conversion unit essentially comprises a thrust nozzle, which simultaneously forms the energy consuming load. Such a thrust nozzle utilizes the pressure differential between the cabin exhaust air and the ambient environment surrounding the aircraft during flight and converts that pressure differential into a thrust that helps to propel the aircraft. In this manner, a temperature increase of the cabin exhaust air stream results in a corresponding increase in the supplementary thrust provided by the thrust nozzle. This embodiment of a substantially combined energy conversion unit and energy consuming load can also be realized in a simple manner by using a generally known cabin air discharge port, but arranged so as to have a thrust nozzle effect.

BRIEF DESCRIPTION OF THE DRAWINGS

In order that the invention may be clearly understood, it will now be described, by way of example, with reference to the accompanying drawings, wherein.

Figure 1:
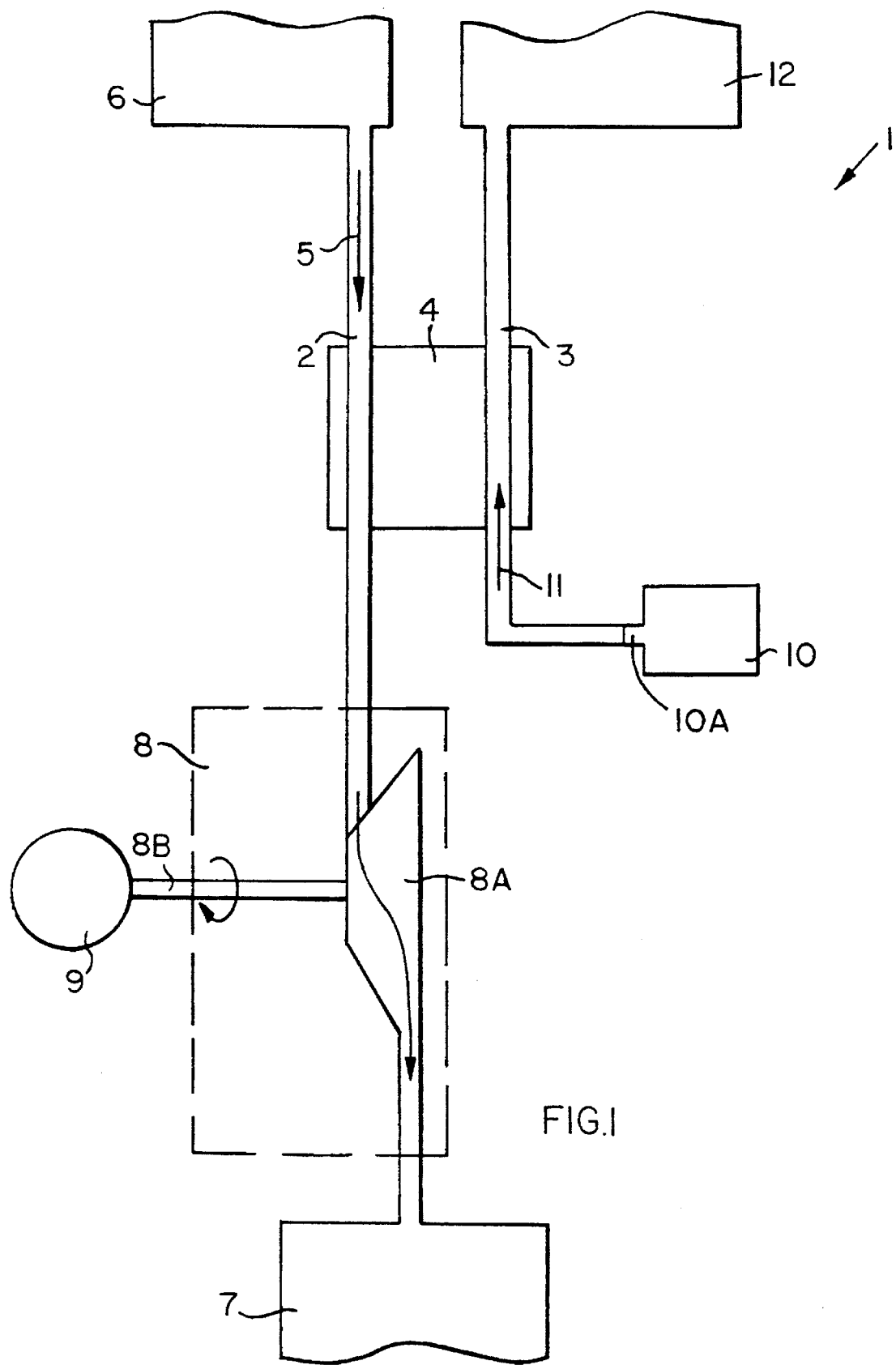
FIG. 1 is a schematic diagram of a first embodiment of an apparatus for generating or recovering energy on board an aircraft according to the invention.

DETAILED DESCRIPTION OF PREFERRED EXAMPLE EMBODIMENTS AND OF THE BEST MODE OF THE INVENTION

Many of the elements of the apparatus according to the invention are the same in all of the embodiments to be described. Thus, FIGS. 1 to 4 all use the same reference numbers when referring to similar components. All of the figures are schematic diagrams showing an apparatus 1 for generating or recovering energy on an aircraft according to the invention. Cabin exhaust air 5 flows from the pressurized cabin 6 of an aircraft through a cabin exhaust air duct 2 to finally be exhausted or discharged to the ambient environment 7 outside of the aircraft. A cabin supply air duct 3, for example, an engine tap air duct 3, provides fresh air to an air conditioning plant 12. The air conditioning plant 12 includes various conditioning units such as coolers and the like, which are not shown in detail. Thus, the air conditioning plant 12 is a climate control plant of a general nature.

An energy conversion unit 8 is connected to the cabin exhaust air duct 2. A bleed air discharge port 10A of a jet engine 10 is connected to supply tap air 11 from the engine into the tap air duct 3. From the tap air duct 3, the tap air 11 is provided to the air conditioning plant 12 to be used as cabin supply air. A heat exchanger 4 is arranged between the cabin exhaust air duct 5 and the cabin supply or tap air duct 3, so as to be arranged upstream of the energy conversion unit 8 in the cabin exhaust air duct 2.

In the embodiment shown particularly in FIG. 1, the energy conversion unit 8 recovers or generates energy from the exhaust air stream 5 and provides that energy to be used for performing technical work. In order to achieve this, the energy conversion unit 8 includes an exhaust air turbine 8A, which is driven by the expansion of the cabin exhaust air 5 due to the existing pressure differential between the pressurized cabin exhaust air 5 coming from the pressurized cabin 6 and the lower air pressure of the ambient environment 7 surrounding the aircraft during flight. The exhaust gas turbine 8A is connected to an output shaft 8B, which provides output energy from the turbine 8A to an energy delivery system or machine 9 such as an electrical generator, hydraulic pump, pneumatic blower, mechanical gear drive or the like. In this manner, the mechanical energy or power of the output shaft 8B of the energy conversion unit 8 can be converted to electrical, pneumatic or mechanical energy and then can be delivered to a corresponding energy consuming load.

As further shown in FIG. 1, but also pertaining to the other embodiments, the heat exchanger 4 advantageously couples the cabin exhaust air duct 2 and the tap air duct 3 for heat exchange with each other, whereby the tap air 11 and the cabin exhaust air 5 flow past each other through respective flow passages of the heat exchanger. The tap air 11 and the cabin exhaust air 5 preferably flow in opposite directions to form a counterflow heat exchanger. In this manner, at least a portion of the thermal energy present in the hot tap air 11 is removed from the tap air 11 and transferred to the cabin exhaust air 5, whereby the temperature of the cabin exhaust air 5 is increased. Due to the increased temperature of the exhaust air 5, the volume flow increases, and the amount of energy that can be recovered from the exhaust air 5 by the turbine 8A is increased.

Simultaneously, the tap air 11 is cooled as it passes through the heat exchanger 4, whereby precooling of the tap air 11, for example directly at the engine 10, is reduced or no longer necessary. A further advantage achieved according to the invention is that, because the temperature of the tap air 11 has been reduced by the time it is provided to the coolers of the air conditioning plant 12, the (heat) load of the top air is reduced and the effective cooling capacity of the air conditioning plant is increased.

Figure 2:
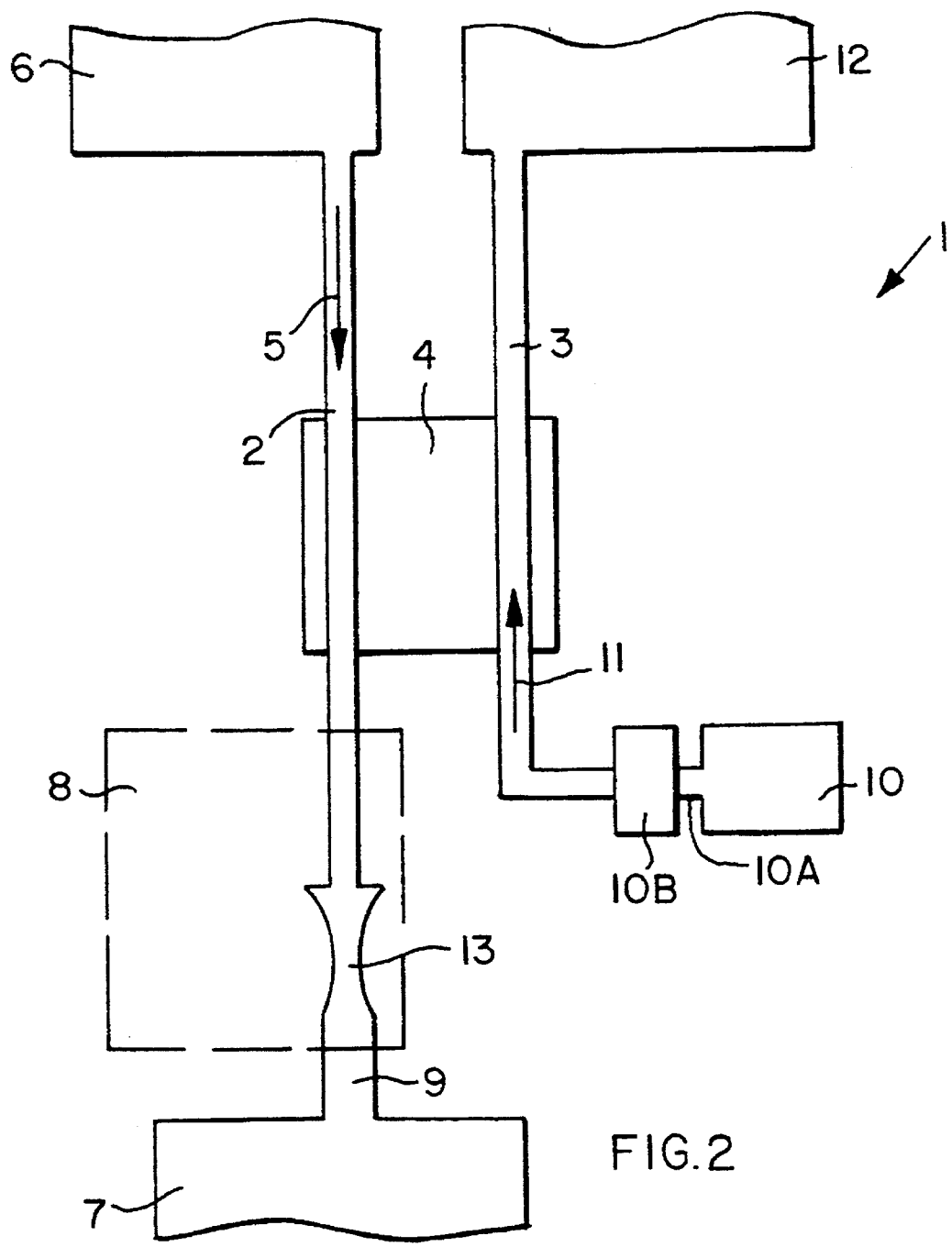
FIG. 2 is a schematic diagram of a second embodiment of an apparatus according to the invention.

FIG. 2 schematically shows a second embodiment of the apparatus 1 for generating or recovering energy on an aircraft according to the invention. As described above, the heat exchanger 4 is arranged between the cabin exhaust air duct 2 and the tap air or cabin supply air duct 3. In this embodiment, as shown in FIG. 2, the energy conversion unit 8 essentially comprises a thrust nozzle 13, which may be a special thrust nozzle or may be a generally known air discharge outlet arranged to have a nozzle function. The thrust outlet 9 of the nozzle 13 forms the external load or energy delivery system 9 described above. Due to the pressure differential between the cabin exhaust air stream 5 end the ambient environment 7 outside the aircraft, a thrust is developed by the thrust nozzle 13, which contributes to the forward propulsion of the aircraft. The transfer of heat energy from the tap air 11 to the cabin exhaust air 5 through the heat exchanger 4 serves to increase the volume flow of the cabin exhaust air stream 5. The corresponding increase of the temperature of the cabin exhaust air stream 5 results in an increase of the propulsion thrust developed by the thrust nozzle 13.

In FIG. 2, a precooler 10B is provided to precool the tap air 11 provided by the engine 10. Specifically, the inlet of the precooler 10B is coupled to the engine bleed air discharge port 10A, and the outlet of the precooler 10B is coupled to the tap air duct 3, which carries the tap air 11 to the air conditioning plant 12. The precooler 10B essentially serves to cool or precool the tap air 11 bled from the engine 10 through the bleed air discharge port 10A, whereby the precooled tap air 11 is then delivered to the air conditioning plane 12 after further passing through the heat exchanger 4. Typically, the precooler 10B is arranged directly at the engine 10 to provide preliminary cooling and additional coolers in the air conditioning plane 12 cool the tap air to the required cabin supply air temperature. By using the heat exchanger 4 according to the present invention, the cooling load on the precooler 10B is reduced or even completely taken over by the heat exchanger 4. By properly arranging and dimensioning the heat exchanger 4 between the exhaust air duct 2 and the tap air duct 3, the required precooling of the tap air 11 can be minimized or even completely eliminated, as shown in FIG. 1 for example.

Figure 3:
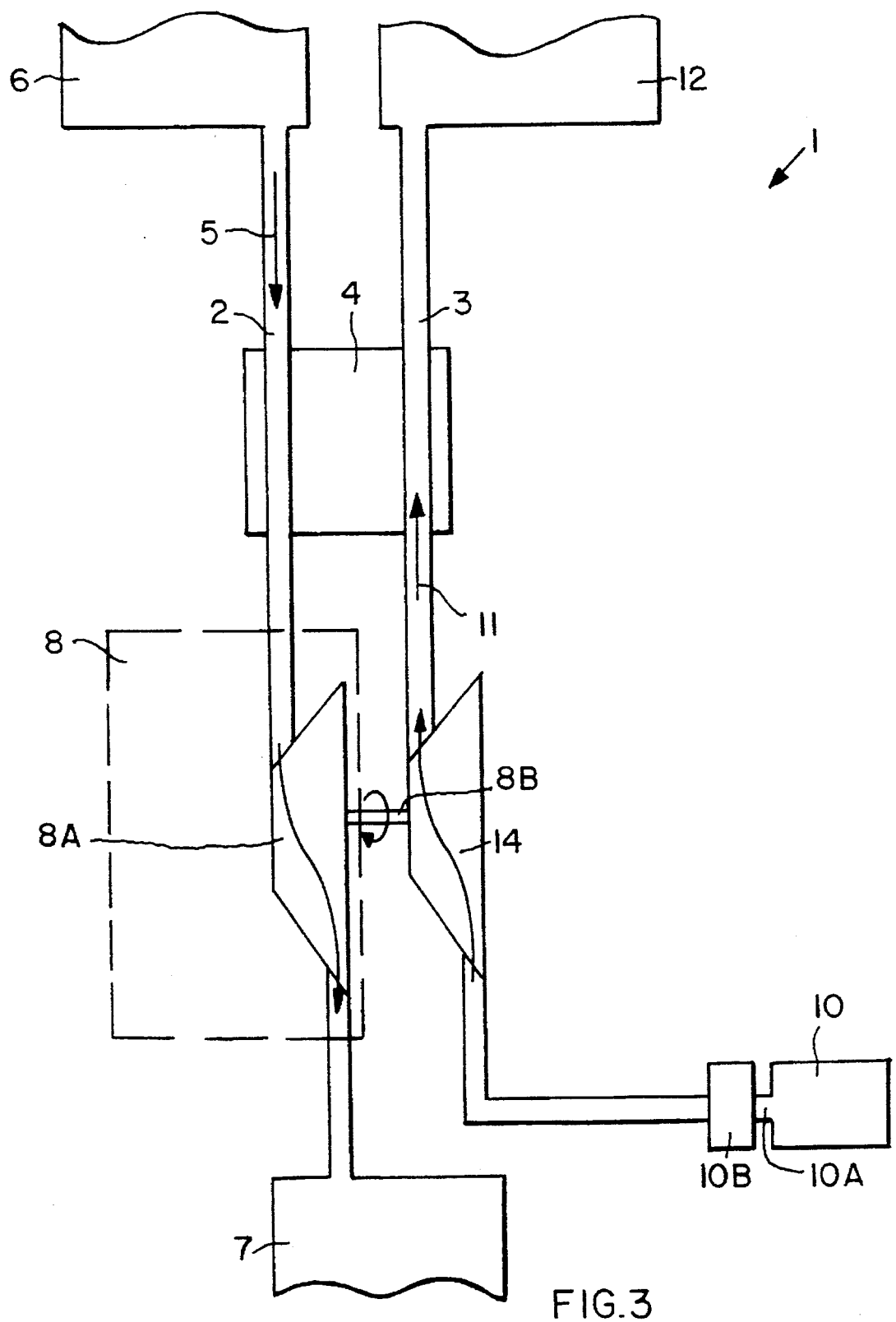
FIG. 3 is a schematic diagram of a third embodiment of an apparatus according to the invention.

FIG. 3 schematically shows a third embodiment of the apparatus 1 according to the invention. As a variant on the general arrangement of the apparatus according to the invention shown in FIG. 1, the output shaft 8B of turbine 8A is connected to a compressor 14. The compressor 14 is connected in the tap air stream 11, that is to say to the tap air duct 3, with the compressor inlet connected to the bleed air discharge port 10A of the engine 10, for example, preferably via a precooler 10B, and with the compressor outlet connected to the tap air duct 3 leading to the heat exchanger 4 and then to the air conditioning plant 12.

In this third embodiment, the mechanical rotational energy provided by the output shaft 8B of the turbine 8A is not delivered to an energy consuming load external to the apparatus 1, but rather is used within the apparatus 1 by the compressor 14. Thus, the compressor 14 uses the pressure differential between the cabin exhaust air 5 and the ambient environment 7 surrounding the aircraft to increase the pressure potential of the tap air 11. In this manner, the required bleed pressure of the tap air 11 provided at the port 10A of the engine 10 is reduced, which correspondingly improves the overall efficiency of the engine 10. As a result, for example, the fuel consumption of the engine 10 is reduced during flight, because the required compression work to be carried out by the engine 10 is reduced.

Figure 4:
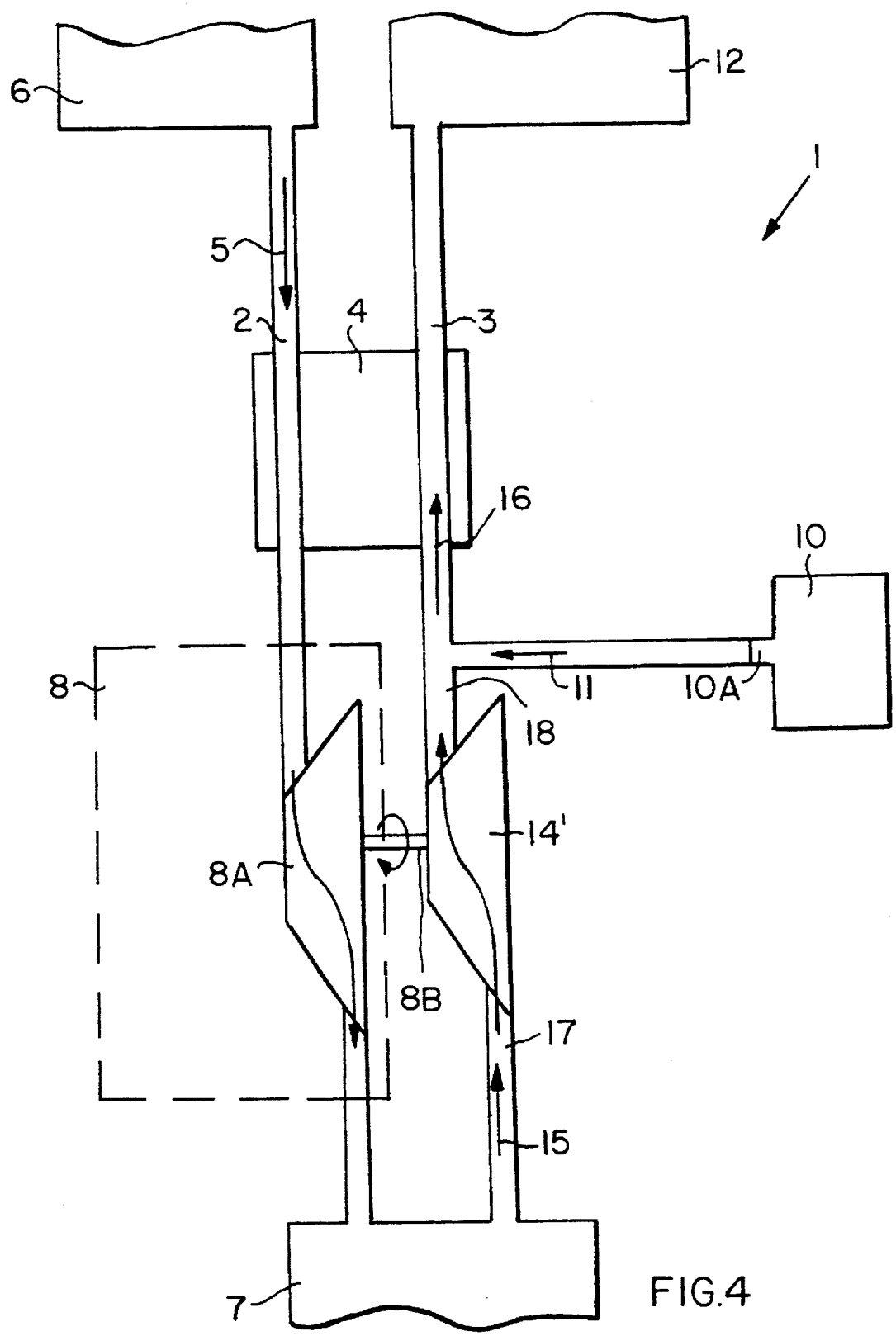
FIG. 4 is a schematic diagram of a fourth embodiment of an apparatus according to the invention.

FIG. 4 schematically shows a fourth embodiment of the apparatus 1 according to the invention. In addition to the essential characterizing elements of the invention shown and described with respect to FIG. 1, this fourth embodiment includes a compressor 14' connected to the output shaft 8B of the exhaust air turbine 8A in a manner similar to compressor 14 described. However, the inlet of compressor 14' is connected to the ambient environment 7 by an external air duct 17. The outlet of compressor 14' is connected by a connecting duct 18 to the air tap duct 3. The compressor 14' is preferably a multi-stage compressor.

In this fourth embodiment, the energy recovered by the exhaust air turbine 8A is not provided to an energy consuming load external to the present apparatus 1, but rather is used within the present apparatus 1 by the compressor 14'. The compressor 14' compresses external ambient air 15 and delivers it through connecting duct 18 to be mixed with the tap air 11 in the tap air duct 3 to form an air mixture 16 that is provided to the air conditioning plant 12 after passing through the heat exchanger 4. In this manner, the required bleed volume of tap air 11 provided by the discharge port 10A of the engine 10 is reduced, whereby the fuel consumption of the engine 10 is reduced because the required compression work, i.e. the compression load, on the engine is reduced. As a result, the overall efficiency of the engine is improved.

Although the invention has been described with reference to specific example embodiments, it will be appreciated that it is intended to cover all modifications and equivalents within the scope of the appended claims.

What is claimed is:

1. An apparatus for generating energy in an aircraft having a pressurizable cabin and at least one engine with an engine bleed air discharge tap, and being surrounded by an ambient environment, comprising an air conditioning plant connected to the cabin, a cabin exhaust air duct connected at a first end to the cabin and connected at a second end to the ambient environment so that an exhaust air stream can flow in said exhaust air duct from the cabin to the environment, a supply duct connected at a first end to the discharge tap and connected at a second end to said air conditioning plant so that engine bleed air can flow from said discharge tap to said air conditioning plant in said supply duct, a heat exchanger arranged between said exhaust air duct and said supply duct so that said exhaust air stream entering said heat exchanger has a relatively low temperature that is increased as said exhaust air stream flows through said heat exchanger and said bleed air entering said heat exchanger has a relatively high temperature that is decreased as said bleed air flows through said heat exchanger, an energy conversion unit interposed in said exhaust air duct downstream from said heat exchanger, and an energy consuming load connected to said energy conversion unit.

2. The apparatus of claim 1, wherein said energy conversion unit comprises a turbine driven by said exhaust air stream and an output shaft connected to said turbine.

3. The apparatus of claim 2, wherein said energy consuming load comprises an energy delivery device adapted to provide energy to an external load, and said energy delivery device is selected from the group consisting of electrical generators, hydraulic pumps, pneumatic blowers and mechanical drive assemblies.

4. The apparatus of claim 1, wherein said energy consuming load comprises an energy delivery device adapted to provide energy to an external load, and said energy delivery device is selected from the group consisting of electrical generators, hydraulic pumps, pneumatic blowers and mechanical drive assemblies.

5. The apparatus of claim 1, wherein said energy consuming load comprises a compressor interposed in said supply duct with a compressor inlet arranged toward the engine bleed air discharge tap and a compressor outlet arranged toward said air conditioning plant.

6. The apparatus of claim 2, wherein said energy consuming load comprises a compressor interposed in said supply duct with a compressor inlet arranged toward the engine bleed air discharge tap and a compressor outlet arranged toward said air conditioning plant.

7. The apparatus of claim 1, further comprising an external air duct connected to the ambient environment, wherein said energy consuming load comprises a compressor arranged with a compressor inlet connected to said external air duct and with a compressor outlet connected to said supply duct.

8. The apparatus of claim 2, further comprising an external air duct connected to the ambient environment, wherein said energy consuming load comprises a compressor arranged with a compressor inlet connected to said external air duct and with a compressor outlet connected to said supply duct.

9. The apparatus claim 1, wherein said energy conversion unit and said energy consuming load together form a single unit comprising at least one outlet nozzle connected to said exhaust air duct and arranged on the aircraft to develop a propulsive thrust.

10. An apparatus for generating energy in an aircraft having a pressurizable cabin and an air conditioning plant connected to the cabin, and being surrounded by an ambient environment, comprising a cabin exhaust air duct connecting the cabin to the environment, a compressed air source, a supply air duct connecting said compressed air source to the air conditioning plant, an energy recovery device interposed in said exhaust air duct, a heat exchanger with a first exchange passage interposed in said exhaust air duct between the cabin and said energy recovery device and with a second exchange passage interposed in said supply air duct in heat exchange relationship to said first exchange passage.

11. The apparatus of claim 10, wherein said energy recovery device comprises an expansion turbine and an output shaft connected to said turbine.

12. The apparatus of claim 11, wherein said compressed air source comprises a compressor connected to said output shaft, and said compressor has a compressed air outlet connected to said supply air duct and has an air inlet.

13. The apparatus of claim 12, wherein the aircraft has at least one engine, said compressed air source further comprises a bleed air tap of the engine, said bleed air tap is connected to said supply air duct in parallel with said compressor, and said compressor air inlet is connected to the ambient environment.

14. The apparatus of claim 12, wherein the aircraft has at least one engine, said compressed air source further comprises a bleed air tap of the engine, and said bleed air tap is connected to said compressed air inlet in series with said compressor.

15. The apparatus of claim 10, wherein said energy recovery device comprises a thrust nozzle arranged at an end of said exhaust air duct opening into the ambient environment.

16. The apparatus of claim 10, wherein a temperature at an inlet of said first exchange passage is lower than a temperature at an inlet of said second exchange passage.

* * * * *

UNITED STATES PATENT AND TRADEMARK OFFICE
CERTIFICATE OF CORRECTION

PATENT NO. : 5,482,229
DATED : January 9, 1996
INVENTOR(S) : Asshauer

It is certified that error appears in the above-indentified patent and that said Letters Patent is hereby corrected as shown below:

On the title page;
In "References Cited Item [56],
    U. S. PATENT DOCUMENTS"
line 4, replace "4,419,226" by --4,419,926--.

Column 3, line 29, replace "the" (second occurrence) by --this--.

Column 5, line 1, replace "top" by --tap--;
         line 33, replace "plane" by --plant--;
         line 36, replace "plane" by --plant--.

Col. 8, line 25, replace "compressed" by --compressor--.

Signed and Sealed this

Second Day of April, 1996

Attest:

BRUCE LEHMAN

Attesting Officer      Commissioner of Patents and Trademarks